United States Patent
Rosskopf

(10) Patent No.: US 11,789,434 B2
(45) Date of Patent: Oct. 17, 2023

(54) METHOD AND CONTROL SYSTEM FOR TECHNICAL PLANTS

(71) Applicant: Siemens Aktiengesellschaft, Munich (DE)

(72) Inventor: Harald Rosskopf, Wolfartsweier (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 59 days.

(21) Appl. No.: 17/166,407

(22) Filed: Feb. 3, 2021

(65) Prior Publication Data

US 2021/0240168 A1 Aug. 5, 2021

(30) Foreign Application Priority Data

Feb. 4, 2020 (EP) .................................... 20155398

(51) Int. Cl.
*G05B 19/418* (2006.01)
*G06F 3/0481* (2022.01)
(52) U.S. Cl.
CPC ..... *G05B 19/4188* (2013.01); *G05B 19/4183* (2013.01); *G05B 19/4185* (2013.01);
(Continued)
(58) Field of Classification Search
CPC ...... G06F 3/0481; G06F 16/178; G06F 16/27; G06F 16/137; G06F 3/065; G06F 16/176;
(Continued)

(56) References Cited

U.S. PATENT DOCUMENTS

| 2008/0154393 | A1 | 6/2008 | Reshef | |
|---|---|---|---|---|
| 2012/0116728 | A1* | 5/2012 | Shear | G06F 30/00 703/1 |

(Continued)

FOREIGN PATENT DOCUMENTS

| EP | 2701019 | 2/2014 | |
|---|---|---|---|
| WO | WO-2010071318 A2 * | 6/2010 | G05B 23/0267 |

OTHER PUBLICATIONS

EP Search Report dated Aug. 13, 2020 based on EP20155398 filed Feb. 4, 2020.

*Primary Examiner* — Roberto Borja
(74) *Attorney, Agent, or Firm* — Cozen O'Connor

(57) ABSTRACT

A control system for a technical plant includes an operator station server and one operator station client, wherein a data model is implemented on the operator station server and the operator station client has display and control units, where the operator station server transmits visualization information representing the data model to the display unit that generates a graphical presentation of the received visualization information for an operator of the control system, receives commands relating to the data model from the operator and forwards them to the control unit, and where the control unit receives the commands, generates revised visualization information and transmits this information directly to the display unit to adjust the graphical presentation of the display unit, generates adjustment commands from the received commands and transmits them directly to the data model on the operator station server to adjust the data model in response to the operator commands.

7 Claims, 5 Drawing Sheets

(52) U.S. Cl.
CPC ..... *G05B 19/41885* (2013.01); *G06F 3/0481* (2013.01); *G05B 2219/13144* (2013.01); *G05B 2219/15009* (2013.01)

(58) Field of Classification Search
CPC ............... G06F 16/275; G06F 16/2255; H04L 67/1095; H04L 67/1097; H04L 67/5682
See application file for complete search history.

(56) References Cited

U.S. PATENT DOCUMENTS

| | | | |
|---|---|---|---|
| 2014/0053227 A1* | 2/2014 | Ruppin | G06F 21/128 726/1 |
| 2014/0059252 A1 | 2/2014 | Stettin et al. | |
| 2017/0085679 A1* | 3/2017 | Mayle | H04L 69/40 |
| 2017/0364320 A1* | 12/2017 | Elumalai | G05B 19/054 |
| 2018/0088564 A1* | 3/2018 | Billi-Duran | G05B 19/41865 |

* cited by examiner

METHOD AND CONTROL SYSTEM FOR TECHNICAL PLANTS

BACKGROUND OF THE INVENTION

1. Field of the Invention

The invention relates to a technical plant, in particular a manufacturing or process plant, a control system for a technical plant, in particular a manufacturing or process plant, comprising at least one operator station server and one operator station, and relates to a method for operating the control system.

2. Description of the Related Art

A control system of a technical plant is assumed to have at least one operator station server and one operator station client connected thereto. The operator station server is configured to generate visual information and to forward this information to the operator station client so that a control system operator is presented with the visual information in the context of operating and monitoring the technical plant.

If structural information of a control system of a technical plant, such as a sequential function chart (SFC), for example, is created and modified by the control system operator in a web browser acting as an operator station client, time lags regularly occur for the following reasons. The web browser sends a command triggered by the plant operator to the operator station server connected to the operator station client. The operator station server implements the operation intended by the command in a data model stored on the operator station server. Thereupon, the operator station server generates revised visualization information that is transmitted back to the web browser, i.e., the operator station client.

The time that elapses between triggering of the command and the revised visualization information being received is not constant or is difficult to define. However, "drag & drop" functionality plays an important role in manipulating graphical structures in the web browser. An object graphically displayed by the web browser is seemingly relocated by the operator with the movement of the computer mouse: the object "attaches" to the mouse. For example, the web browser simulates the movement of the graphical object when relocating the object.

If hierarchical, automatically ordered diagrams such as the SFC structure in Siemens SIMATIC BATCH are changed, then the problem of graphic "pumping" may also occur. This means that the graphical objects around the target position of an object to be moved must also be moved to a new position to create space for the moved object. However, as long as the path "trigger command in web browser→transfer to operator station server→revise model on server→transfer back to web browser" has not yet been completed, the old state of the graphical representation is retained in the web browser after a command has been triggered or a graphical object has been moved, until the revised representation transferred from operator station server is received by the web browser. The operator must therefore wait until the revised representation is displayed and must not trigger any new commands. Otherwise, when he tries to select a graphical object, he might get the object "pushed away from his hand". The intended illusion that "the object is in the operator's hand (i.e., on the computer mouse) and he moves it to a new position" is lost if the object does not remain at the new position after moving it, but is displayed briefly (until the above-described path has been completed) at the old position.

Current developments in the field of a control system that can be operated by a web browser follow the Model-View-Controller (MVC) scheme 1, which is illustrated in FIG. Here a (data) model 3 (Model) is stored on an operator station server 2. The operator station server 2 is connected to an operator station client 4, upon which a web browser is implemented. The operator station client 4 has a display unit 6 (View) and a control unit 8 (Controller). The operator station server 2 transmits visualization information 5 relating to the data model 3 to the display unit 6 of the operator station client 4 or more specifically of the web browser. The web browser graphically displays the visualization information coming from the model 3 for the control system operator.

The display unit 6 additionally provides the operator with a user interface that enables the operator to trigger commands 7 such as the graphical shifting of displayed graphical objects within the graphical display. The commands 7 are forwarded to the control unit 8 within the operator station client 4. The control unit 8 processes the user's commands 7 and in many cases transmits updated visualization information directly to the display unit 6 (as indicated by the arrow 9). Most of these cases are simple formatting commands 7 from the operator, e.g., changing a font or a font color used on the display unit 6.

More complex commands 7 such as the creation of new graphical objects or changing the hierarchy between graphical objects pertain to the structure of the model 3 on the operator station server 2. These are transmitted to the (data) model 3 by the control unit 8 using an adjustment command 10—for the purpose of revising the (data) model 3 on the operator station server 2. After the model 3 has been adjusted, updated visualization information 5 is in turn transmitted to the display unit 6. Therefore, in certain combinations of circumstances, an operator command 7 results in data having to be transferred twice across the "server-client" boundary, which can lead to the disadvantages explained above.

It would be possible for the operations triggered by the command 7 to be performed twice: on the one hand on the representation in the display unit 6 via the direct feedback 9 from the control unit 8 and, on the other hand, on the operator station server 2 via the adjustment command 10 to the model 3. As a result, the response to the operator's command 7 would be immediate, i.e., without significant delay. However, the two operations may diverge. This would mean that information is present in the model 3 on the operator station server 2 that is different from the information displayed to the operator by means of the display unit 6.

Different implementations of the two operations or timing problems can therefore cause an inconsistency between "Model" and "View" in the MVC scheme. This can mean, among other things, that in the time between triggering the command 7 and the revised visualization information being received from the operator station server 2, the operator can select, in the web browser display, certain graphical objects which according to the revised model 3 on the operator station server 2 should actually no longer be presented to the operator. This discrepancy can have a negative effect on the operability of the control system.

Direct transmission of the operator's command 7 and the thereby intended operations to the model 3 on the operator station server 2 (i.e., without involvement of the control unit 8) would contradict the principles of the MVC model, because no direct modification of the model 3 by the display unit 6 is provided here.

In addition, it would be possible to allow no direct feedback from the control unit 8 to the display unit 6. Although this would eliminate any inconsistency of the visualization information between display unit 6 and model 3, the control system would have to sacrifice a significant degree of performance, particularly because of the longer signal path.

SUMMARY OF THE INVENTION

It is an object of the invention is to provide a control system for a technical plant, in particular a manufacturing or process plant, which will provide consistency of visualization information in the context of a server-client connection in compliance with the Model-View-Controller (MVC) scheme and without significant loss of performance.

This and other objects and advantages are achieved in accordance with the invention by technical plant, a control system for the technical plant and by a method for operating the control system, where the control system has at least one operator station server and operator station client, where a data model is implemented on the operator station server, and where the operator station client has a display unit and a control unit.

In accordance with the invention, the operator station server is configured to transmit visualization information representing the data model to the display unit of the operator station client, the display unit of the operator station client is configured to generate a graphical presentation of the received visualization information for a control system operator, receive commands relating to the data model from the operator and to forward them to the control unit, receive the commands from the display unit, generate revised visualization information from the received commands and to transmit this information directly to the display unit in order to adjust the graphical presentation on the display unit, and the control unit is further configured to generate adjustment commands from the received commands and to transmit these adjusted commands directly to the data model on the operator station server to adjust the data model in response to the operator's command.

The display unit of the control system, after receiving the revised visualization information from the control unit and subsequently adjusting the graphical presentation, is particularly configured to generate a checksum specific to the current graphical presentation. The operator station server, after receiving the adjustment commands from the control unit and subsequent adjustment of the data model, is particularly configured to generate and transmit to the display unit a checksum specific to the current data model, where the display unit is further configured to compare the checksum it generates with the checksum transmitted by the operator station server to detect any inconsistency between the graphical presentation on the display unit and the data model on the operator station server, and, in the event of any inconsistency, to request transmission of the visualization information representing the current data model from the operator station server.

In the present context, a control system is understood to be a computer-aided technical system that includes functionalities for the display, operation and control of a technical system such as a manufacturing or production plant. In the present case, the control system comprises sensors for determining measured values and various actuators. The control system additionally comprises process- or production-related components that are used to control the actuators or sensors. The control system has, among other things, components for visualizing the technical plant and for engineering purposes. The term control system also includes additional computing units for more complex controls and systems for data storage and processing.

The technical plant can be a plant from the process industry such as a chemical, pharmaceutical, petrochemical plant or a plant from the food and beverage industry. This also includes any plants from the production industry, factories in which, for example, cars or goods of all kinds are produced. Technical plants that are suitable for implementation of the method in accordance with the invention can also come from the field of energy generation. Wind turbines, solar plants or power plants for energy production are also subsumed under the term technical plant.

Here, an "operator station server" means a server that centrally acquires data from an operator communication and monitoring system as well as usually alarm and measurement value archives of a control system of a technical plant and makes them available to users. The operator station server usually establishes a communication link to automation systems of the technical plant and passes on technical plant data "operator station clients" that are used to operate and observe the operation of the individual functional elements of the technical plant. The operator station server itself may have client functions for accessing data (archives, messages, tags, variables) of other operator station servers. Thus, images of operation of the technical plant can be combined on the operator station server with variables of other operator station servers (server-server communication). The operator station server can be a Siemens SIMATIC PCS 7 Industrial Workstation Server, but is not limited to such a server.

The "data model" is a linkage of different data which is combined in a common model. It is implemented on the operator station server. In other words, the data model is stored in a storage device on the operator station server. This storage device can also be physically located outside the operator station server, e.g., in a cloud environment.

With the control system in accordance with the invention, the display unit, in conjunction with the control unit, can provide an immediate response to commands from the operator by appropriately adjusting the graphical presentation with virtually no delay. At the same time, the generation of checksums and the comparison thereof provides certainty that what is graphically presented to the operator in response to his command is also correct, i.e., is congruent with the data model to be displayed on the operator station server. The control system in accordance with the invention provides improved user-friendliness without violating the MVC scheme. The control system can be operated "fluidly" and ensures that the visualization information graphically presented via the operator station client is consistent with the underlying data model on the operator station server.

The algorithm for generating the checksums is advantageously established such that all the operator commands that produce a change in the graphical presentation are also included in the checksum generation. A "message digest algorithm 5" (or MD5 for short) procedure is particularly advantageous for this purpose. This procedure also takes into account, among other things, pure graphical shifting operations by the operator.

It is also an object of the invention to provide a technical plant, in particular a manufacturing or process plant, having at least one control system which is configured in accordance with the above-disclosed embodiments.

It is a further object of the invention to provide a method for operating a control system for a technical plant, in particular a manufacturing or process plant, which has at least one operator station server and one operator station client, wherein a data model is implemented on the operator station server, and wherein the operator station client has a display unit and a control unit.

The method comprising a) transmitting visualization information representing the data model from the operator station server to the display unit of the operator station client, b) generating, by the display unit of the operator station client, a graphical presentation of the received visualization information for an operator of the control system, c) receiving operator commands to change the graphical presentation in the display unit, and forwarding of these generated commands to the control unit by the display unit, d) receiving the commands from the display unit by the control unit, e) generating revised visualization information from the received visualization information and direct transmission of the revised visualization information to the display unit by the control unit to adjust the graphical presentation of the display unit, f) generating adjustment commands from the received commands and directly transmitting the adjustment commands to the data model on the operator station server by the control unit such that the operator station server adjusts the data model in response to the operator's commands, g) generating a checksum specific to the current graphical presentation by the display unit after the display unit has received the revised visualization information from the control unit and has adjusted the graphical presentation accordingly, i) generating a checksum specific to the current data model by the operator station server after the operator station server has received the adjustment commands from the control unit and has adjusted the data model accordingly, j) transferring the checksum from the operator station server to the display unit, k) comparing the checksum generated by the display unit with the checksum generated by the operator station server to detect any inconsistency between the graphical presentation of the display unit and the data model on the operator station server, l) In the event of any inconsistency between the two compared checksums, requesting visualization information representing the current data model from the operator station server by the display unit, and m) transferring the visualization information representing the current data model from the operator station server to the display unit and graphically presenting the visualization information.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The above-described features, characteristics and advantages of this invention, as well as the manner in which they are achieved, will become clearer and more comprehensible in conjunction with the following description of the exemplary embodiment which will be explained in greater detail with reference to the accompanying drawings, in which.

DETAILED DESCRIPTION OF THE EXEMPLARY EMBODIMENTS

Figure 1:
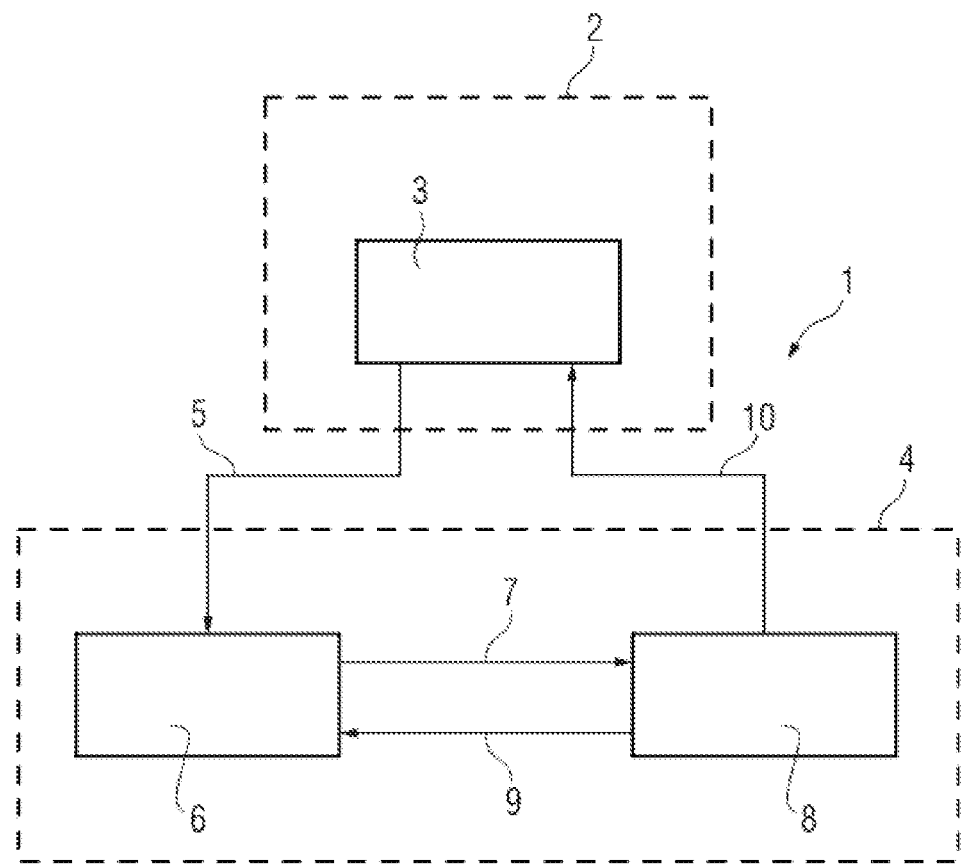
FIG. 1 shows an MVC scheme in accordance with the prior art.
Figure 2:
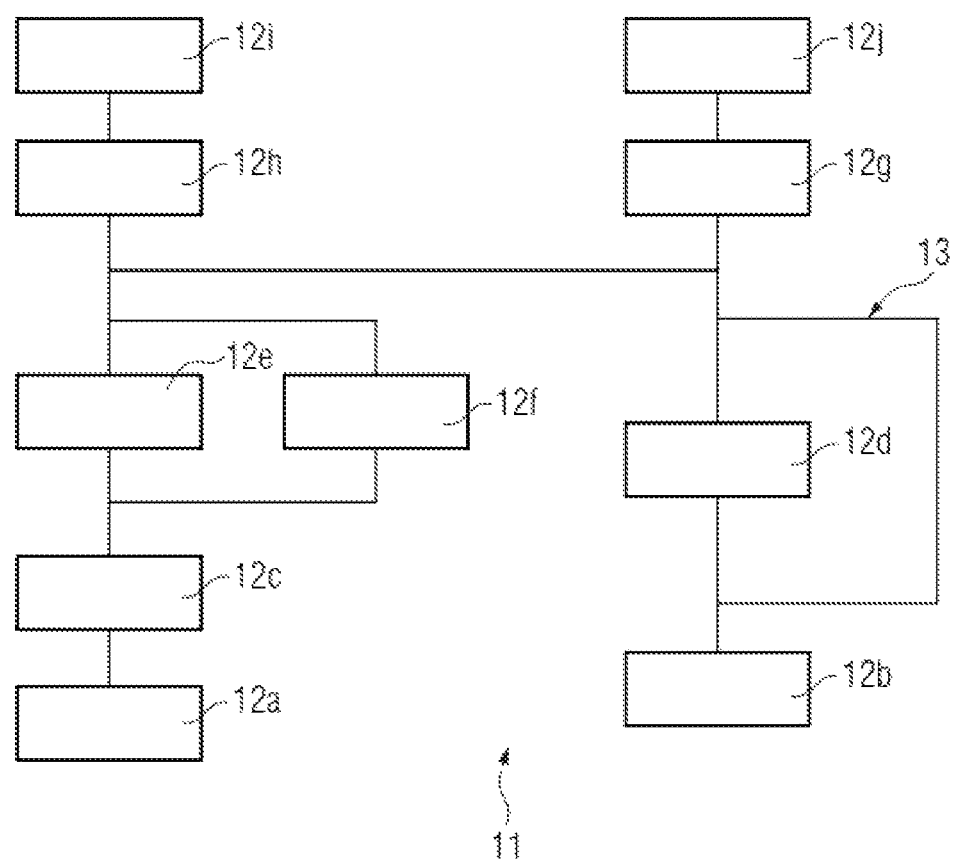
FIG. 2 shows visualization information graphically presented by a display unit of an operator station client in accordance with the invention.
Figure 5:
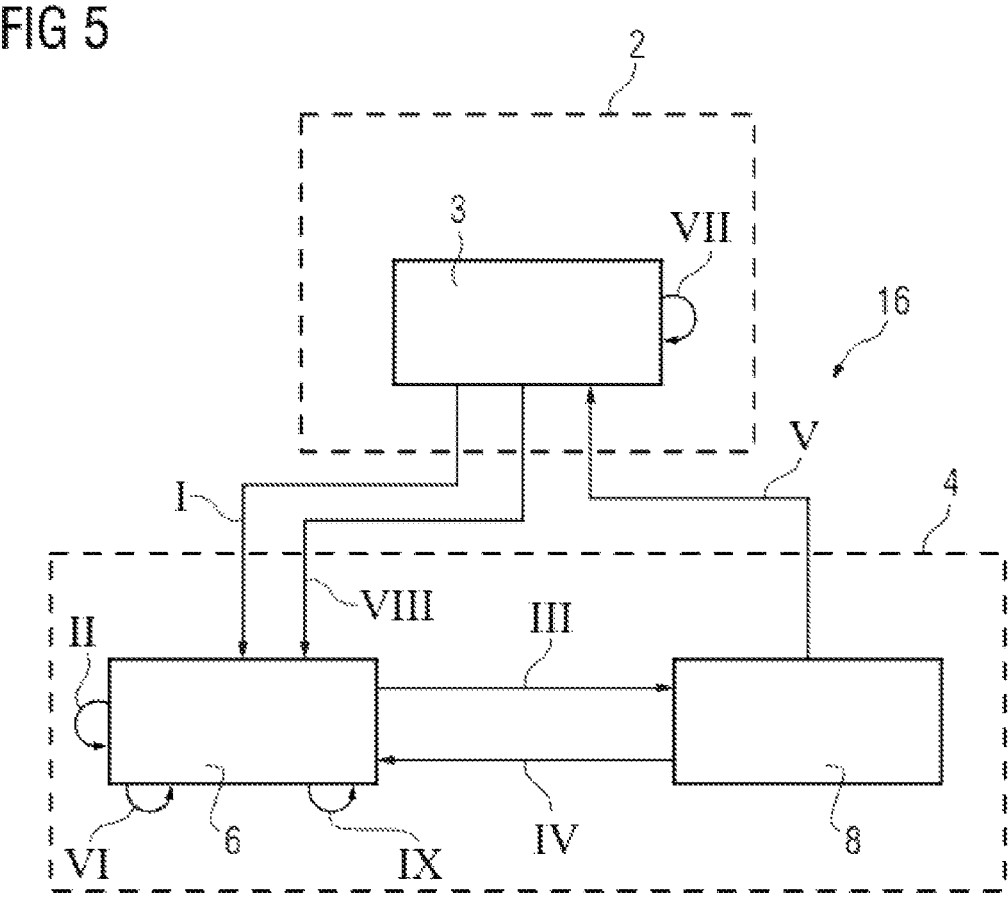
FIG. 5 is a flowchart of the method in accordance with the invention.

FIG. 2 shows visualization information 11 that corresponds to a data model 3 that is represented on an operator station server 2 (cf. also FIG. 5). The visualization information comprises ten graphical objects 12*a*, 12*b*, 12*c*, 12*d*, 12*e*, 12*f*, 12*g*, 12*h*, 12*i*, 12*j*, which are graphically linked by connecting lines 13. This can be, for example, the graphical presentation of a sequential function chart (SFC) that allows state- or event-controlled execution of production processes based on sequence chains in a technical plant designed as a process plant.

Figure 3:
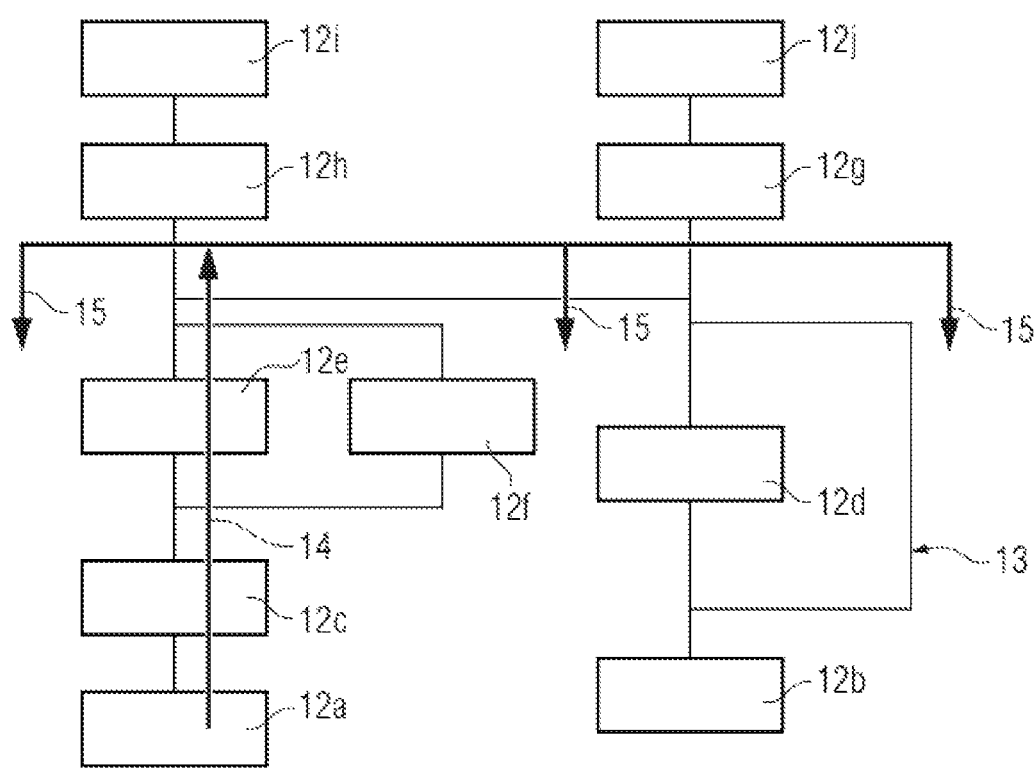
FIG. 3 shows the visualization information from FIG. 2 accordance with an embodiment of the invention.
Figure 4:
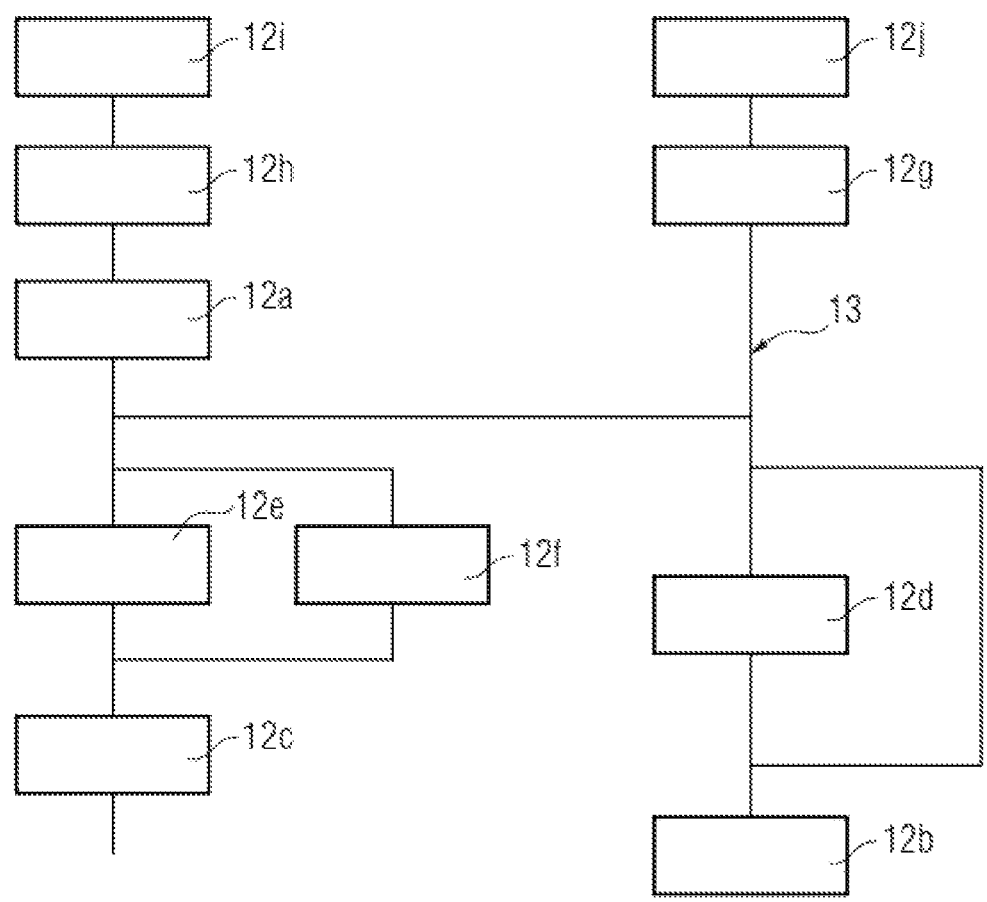
FIG. 4 shows the visualization information from FIG. 3 accordance with another embodiment of the invention.

An operator now wants to move an object 12*a* (bottom left in the drawing area in FIG. 2) graphically upward in the drawing area so that it is positioned below the object 12*h*. FIG. 3 shows that the object 12*a* is to be moved upwards along a direction 14, while the objects with the associated connecting lines 13 are to be moved downward along an opposite direction 15 to provide the object 12*a* with the necessary space within the visualization information 11. FIG. 4 shows the object 12*a* in its new position.

With reference to FIG. 5, it will now be explained which operations run automatically in the background while the operator gives the (move) command explained above. FIG. 5 shows a control system 16 comprising an operator station server 2 and, connected thereto, an operator station client 4. A data model 3 has been implemented in the operator station server 2. The operator station client 4 has a display unit 6 and a control unit 8.

In a first step I, the operator station server 2 transmits visualization information 11 representing the data model 3 to the display unit 6 of the operator station client 4.

In a second step II, the display unit 6 generates the graphical presentation of the received visualization information 11, as shown in FIG. 2, for the operator of the control system 16.

The display unit 6 receives a (move) command from the operator and, in a third step III, forwards this command to the control unit 8 of the operator station client 8.

After the control unit 8 has received the command from the display unit 6, the control unit 8 generates revised visualization information 11 from the received commands and transmits the revised visualization information 11 directly to the display unit 6 in order to adjust the graphical presentation of the display unit 6 (fourth step IV).

The control unit 8 additionally generates adjustment commands from the received commands and, in a fifth step V, transmits them directly to the data model 3 on the operator station server 2 so that the operator station server 2 adjusts the data model 3 in response to the operator's command.

In a sixth step VI, the display unit 6 generates a checksum specific to the current graphical presentation after the display unit 6 has received the revised visualization information 11 from the control unit 8 and has then adjusted the graphical presentation accordingly.

In a seventh step VII, which can occur before, after or in parallel with the sixth step VI, the operator station server 2 generates a checksum specific to the current data model 3 revised on the basis of the adjustment command after the operator station server 2 has received the adjustment commands from the control unit 8 and has adjusted the data model 3 accordingly.

In an eighth step VIII, the checksum is transferred from the operator station server 2 to the display unit 6.

In a ninth step IX, the display unit 6 compares the checksum generated by the display unit 6 with the checksum generated by the operator station server 2 in order to detect any inconsistency between the graphical presentation of the display unit 6 and the data model 3 on the operator station server 2.

It should be understood the above-described method steps can be repeated as often as required.

In the event of an inconsistency between the two compared checksums, the display unit 6 can request visualization information 11 representing the current data model 3 from the operator station server 2, whereupon the visualization information 11 representing the current data model 3 is transferred from the operator station server 2 to the display unit 6 and the (correct) visualization information 11 is graphically presented. For reasons of clarity, the last method steps are not indicated in FIG. 5. It should also be understood these method steps can also be repeated as often as required in the event of inconsistencies.

Thus, while there have been shown, described and pointed out fundamental novel features of the invention as applied to a preferred embodiment thereof, it will be understood that various omissions and substitutions and changes in the form and details of the methods described and the devices illustrated, and in theft operation, may be made by those spilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A control system for a technical plant, comprising:
    at least one operator station server; and
    at least one operator station client, a data model being implemented on the at least one operator station server, and the at least one operator station client including a display unit and a control unit;
    wherein the at least one operator station server is configured to transmit visualization information representing the data model to the display unit of the at least one operator station client;
    wherein the display unit of the at least one operator station client is configured to generate a graphical presentation of the received visualization information for an operator of the control system;
    wherein the display unit of the at least one operator station client is further configured to receive commands relating to the data model from the operator and to forward said received commands to the control unit;
    wherein the control unit is configured to receive the commands from the display unit;
    wherein the control unit is further configured to generate revised visualization information from the received commands and to transmit said revised visualization information directly to the display unit to adjust the graphical presentation of the display unit;
    wherein the control unit is further configured to generate adjustment commands from the received commands and to transmit said adjustment commands directly to the data model on the at least one operator station server to adjust the data model in response to the operator's commands;
    wherein the display unit is further configured to generate a checksum specific to the current graphical presentation after receiving the revised visualization information from the control unit and subsequent adjustment of the graphical presentation;
    wherein the at least one operator station server is configured to generate and transmit to the display unit a checksum specific to the current data model after receiving the adjustment commands from the control unit and subsequent adjustment of the data model;
    wherein the display unit is further configured to compare the checksum generated by the display unit with the checksum transmitted by the operator station server to detect a possible inconsistency between the graphical presentation of the display unit and the data model on the at least one operator station server, and further configured to request transmission of the visualization information representing the current data model from the at least one operator station server in an event of any inconsistency;
    wherein said visualization information representing the data model is graphically presented as a sequential function chart (SFC) which allows state- or event-controlled execution of production processes based on sequence chains in the technical plant; and
    wherein the at least one operator station server is further configured to utilize a "message-digest algorithm 5" to generate the checksums by the display unit and the at least one operator station server, pure graphical shifting operations being taken into account.

2. The control system as claimed in claim 1, wherein the display unit is further configured to utilize the "message-digest algorithm 5" to generate the checksums by the display unit and the at least one operator station server.

3. The control system as claimed in claim 1, wherein the technical plant comprises a manufacturing or process plant.

4. A technical plant including at least one control system as claimed in claim 1.

5. A method for operating a control system for a technical plant including at least one operator station server and at least one operator station client, a data model being implemented on the at least one operator station server and the at least one operator station client including a display unit and a control unit, the method comprising:
    a) transmitting visualization information representing the data model to the display unit of the at least one operator station client by the at least one operator station server;
    b) generating, by the display unit of the at least one operator station client, a graphical presentation of the received visualization information for an operator of the control system;

c) receiving operator commands to change the graphical presentation in the display unit, and forwarding said received operator commands to the control unit by the display unit;

d) receiving the forwarded operator commands from the display unit by the control unit;

e) generating revised visualization information from the received operator commands and directly transmitting the revised visualization information to the display unit by the control unit to adjust the graphical presentation of the display unit;

f) generating adjustment commands from the received commands and transmitting the generated adjustment commands directly to the data model on the at least one operator station server by the control unit such that the operator station server adjusts the data model in response to the operator commands;

g) generating, by the display unit, a checksum specific to the current graphical presentation after the display unit has received the revised visualization information from the control unit and has adjusted the graphical presentation accordingly;

i) generating, by the operator station server, a checksum specific to the current data model after the operator station server has received the adjustment commands from the control unit and has then adjusted the data model accordingly;

j) transferring the checksum from the at least one operator station server to the display unit;

k) comparing the checksum generated by the display unit with the checksum generated by the operator station server to detect any inconsistency between the graphical presentation of the display unit and the data model on the at least one operator station server;

l) requesting visualization information representing the current data model from the at least one operator station server by the display unit in an event of inconsistency between the compared checksums;

m) transferring the visualization information representing the current data model from the at least one operator station server to the display unit and graphically presenting the visualization information;

wherein said visualization information representing the data model is graphically presented as a sequential function chart (SFC) which allows state- or event-controlled execution of production processes based on sequence chains in the technical plant; and wherein a "message digest algorithm 5" is utilized for each generation of the checksums by the at least one operator station server, pure graphical shifting operations being taken into account.

6. The method as claimed in claim 5, wherein the "message-digest algorithm 5" is further utilized for each generation of the checksums by the display unit.

7. The method as claimed in claim 5, wherein the technical plant comprises a manufacturing or process plant.

* * * * *